(12) United States Patent
Paley et al.

(10) Patent No.: US 10,162,561 B2
(45) Date of Patent: Dec. 25, 2018

(54) MANAGING BACKUP OF LOGICAL-TO-PHYSICAL TRANSLATION INFORMATION TO CONTROL BOOT-TIME AND WRITE AMPLIFICATION

(71) Applicant: Apple Inc., Cupertino, CA (US)

(72) Inventors: Alexander Paley, Cupertino, CA (US); Yuhua Liu, Belmont, CA (US)

(73) Assignee: Apple Inc., Cupertino, CA (US)

( * ) Notice: Subject to any disclaimer, the term of this patent is extended or adjusted under 35 U.S.C. 154(b) by 202 days.

(21) Appl. No.: 15/190,216

(22) Filed: Jun. 23, 2016

(65) Prior Publication Data

US 2017/0269844 A1    Sep. 21, 2017

Related U.S. Application Data

(60) Provisional application No. 62/310,832, filed on Mar. 21, 2016.

(51) Int. Cl.

| | |
|---|---|
| *G06F 3/06* | (2006.01) |
| *G06F 12/1009* | (2016.01) |
| *G06F 12/02* | (2006.01) |
| *G06F 11/14* | (2006.01) |

(52) U.S. Cl.
CPC ............ *G06F 3/065* (2013.01); *G06F 3/0619* (2013.01); *G06F 3/0679* (2013.01); *G06F 11/1446* (2013.01); *G06F 12/0246* (2013.01); *G06F 12/1009* (2013.01); *G06F 2212/1016* (2013.01); *G06F 2212/1032* (2013.01); *G06F 2212/202* (2013.01); *G06F 2212/7201* (2013.01)

(58) Field of Classification Search
CPC ............ G06F 11/1471; G06F 2201/84; G06F 11/1417; G06F 11/1469; G06F 11/1461; G06F 11/1402; G06F 11/1446
See application file for complete search history.

(56) References Cited

U.S. PATENT DOCUMENTS

| | | |
|---|---|---|
| 8,082,384 B2 | 12/2011 | Sareen et al. |
| 8,285,955 B2 | 10/2012 | Frame et al. |
| 8,838,936 B1 | 9/2014 | Salessi et al. |

(Continued)

OTHER PUBLICATIONS

European Application # 17155039.5 search report dated Aug. 17, 2017.

*Primary Examiner* — Reginald G Bragdon
*Assistant Examiner* — Thanh D Vo
(74) *Attorney, Agent, or Firm* — Dickinson Wright RLLP (57) ABSTRACT

An apparatus includes an interface and a processor. The interface is configured to communicate with a non-volatile memory. The processor is configured to hold a translation table that maps between logical addresses and respective physical addresses in the non-volatile memory, to back-up to the non-volatile memory a baseline version of the translation table in one or more bulks, to additionally back-up to the non-volatile memory one or more incremental updates, which specify changes relative to the baseline version of the translation table caused by subsequent storage operations, to determine a maximal number of the incremental updates that, when recovered together with the baseline version from the non-volatile memory and replayed in the processor, meets a target recovery time of the translation table, and to set a number of the backed-up incremental updates to not exceed the maximal number.

20 Claims, 3 Drawing Sheets

(56) References Cited

U.S. PATENT DOCUMENTS

| | | |
|---|---|---|
| 8,886,870 B2 | 11/2014 | Adler et al. |
| 8,909,851 B2 | 12/2014 | Jones et al. |
| 8,949,512 B2 | 2/2015 | Vogan et al. |
| 8,954,694 B2 | 2/2015 | Tomlin et al. |
| 8,966,205 B1 | 2/2015 | Lo et al. |
| 9,043,536 B2 | 5/2015 | Ho et al. |
| 9,104,315 B2 | 8/2015 | Sinclair |
| 9,189,385 B2 | 11/2015 | Cohen et al. |
| 9,218,280 B2 | 12/2015 | Zhang et al. |
| 9,268,682 B2 | 2/2016 | Tomlin et al. |
| 2005/0251617 A1 | 11/2005 | Sinclair |
| 2009/0327589 A1 | 12/2009 | Moshyedi |
| 2012/0303866 A1* | 11/2012 | Bandic .................. G11B 5/012 711/103 |
| 2014/0136753 A1 | 5/2014 | Tomlin et al. |
| 2014/0258588 A1 | 9/2014 | Tomlin et al. |
| 2014/0325117 A1 | 10/2014 | Canepa et al. |
| 2016/0048354 A1 | 2/2016 | Walsh et al. |

* cited by examiner

MANAGING BACKUP OF LOGICAL-TO-PHYSICAL TRANSLATION INFORMATION TO CONTROL BOOT-TIME AND WRITE AMPLIFICATION

CROSS-REFERENCE TO RELATED APPLICATIONS

This application claims the benefit of U.S. Provisional Patent Application 62/310,832, filed Mar. 21, 2016, which is incorporated herein by reference.

TECHNICAL FIELD

Embodiments described herein relate generally to data storage, and particularly to methods and systems for managing the storage of logical-to-physical mapping information to control boot-time and write amplification.

BACKGROUND

In various storage systems a memory controller operating in accordance with a logical address space stores data in one or more non-volatile memory devices operating in accordance with a physical address space. The memory controller typically holds, in a volatile memory, a logical-to-physical mapping table for translating between the logical and physical addresses. To protect the translation information from being lost, e.g., in case of power shutdown, the memory controller typically backs-up the translation table in the volatile memory devices.

Methods for saving and recovering logical-to-physical translation information are known in the art. For example, U.S. Patent Application Publication 2009/0327589, whose disclosure is incorporated herein by reference, describes a method of table journaling in a flash storage device comprising a volatile memory and a plurality of non-volatile data blocks. Methods described include the steps of creating a first copy in a first one or more of the plurality of non-volatile data blocks of an addressing table stored the volatile memory, writing transaction log data to a second one or more of the plurality of non-volatile data blocks, and updating the first copy of the addressing table based on changes to the addressing table stored in the volatile memory after the second one or more of the plurality of non-volatile data blocks have been filled with transaction log data.

U.S. Pat. No. 8,909,851, whose disclosure is incorporated herein by reference, describes a method of operation of a storage control system including: providing a memory controller; accessing a volatile memory table by the memory controller; writing a non-volatile semiconductor memory for persisting changes in the volatile memory table; and restoring a logical-to-physical table in the volatile memory table, after a power cycle, by restoring a random access memory with a logical-to-physical partition from a most recently used list.

SUMMARY

An embodiment that is described herein provides an apparatus that includes an interface and a processor. The interface is configured to communicate with a non-volatile memory. The processor is configured to hold a translation table that maps between logical addresses and respective physical addresses in the non-volatile memory, to back-up to the non-volatile memory a baseline version of the translation table in one or more bulks, to additionally back-up to the non-volatile memory one or more incremental updates, which specify changes relative to the baseline version of the translation table caused by subsequent storage operations, to determine a maximal number of the incremental updates that, when recovered together with the baseline version from the non-volatile memory and replayed in the processor, meets, a target recovery time of the translation table, and to set a number of the backed-up incremental updates to not exceed the maximal number.

In some embodiments, the processor is configured to back-up the incremental updates between savings of successive bulks. In other embodiments, the processor is configured to determine the maximal number by evaluating a remaining time of the target recovery time for loading and replaying the incremental updates, assuming the entire baseline version has been loaded. In yet other embodiments, the processor is configured to select a differential number of the incremental updates allowed between successive bulks based on a bulk size so as to meet the target recovery time and to sustain a workload performance of a host communicating with the processor.

In an embodiment, the processor is configured to select the differential number based on a fragmentation level of the translation table. In another embodiment, the processor is configured to estimate the fragmentation level by calculating a ratio between a range of logical addresses covered by a bulk and the bulk size. In yet another embodiment, the processor is configured to receive data for storage from a host whose write activity profile includes a mixture of random activity and sequential activity, and the processor is further configured to select an allowed number of the incremental updates between successive storage of the bulks based on the write activity profile.

In some embodiments, the processor is configured to select a first allowed number for a first mixture having a dominant random activity and to select a second allowed number for a second mixture having a dominant sequential activity, the first allowed number being smaller than the second allowed number. In other embodiments, the processor is configured select a number of the incremental updates saved between bulks during normal operation, based on a prediction of whether or not reconstructing the translation table during boot requires de-fragmentation of the translation table. In yet other embodiments, the processor is configured to assess, during boot operation or during normal operation, a replay, time of the incremental updates, and if the assessed replay time is shorter than a predefined time to re-use a recent baseline version of the translation table by saving, during normal operation, only incremental updates.

There is additionally provided, in accordance with an embodiment that is described herein, a method including holding in a memory controller that stores data in a non-volatile memory, a translation table that maps between logical addresses and respective physical addresses in the non-volatile memory. A baseline version of the translation table is backed-up to the non-volatile memory in one or more bulks. One or more incremental updates, which specify changes relative to the baseline version of the translation table caused by subsequent storage operations, additionally backed-up to the non-volatile memory. A maximal number of the incremental updates is determined so that when recovered together with the baseline version from the non-volatile memory and replayed in the memory controller, meets a target recovery time of the translation table. The number of the backed-up incremental updates is set to not exceed the maximal number.

These and other embodiments will be more fully understood from the following detailed description of the embodiments thereof, taken together with the drawings in which:

DETAILED DESCRIPTION OF EMBODIMENTS

Overview

In various storage systems, such as solid state drives (SSDs), a controller stores data for a host in one or more non-volatile memory devices. Typically, the commands from the host specify logical addresses in logical address space, whereas the memory devices operate in accordance with physical addresses in a physical address space. The controller translates between the logical and physical addresses using a translation table, which the controller typically holds in a local volatile memory. In the context of the present disclosure and in the claims, the non-volatile memory devices are collectively referred to as a "non-volatile memory."

Since information stored in the volatile memory is not protected from power interruption, the controller typically saves the translation information in the non-volatile memory. In principle, the controller can write the entire translation table to the non-volatile memory for every table update. The translation table size, however, is typically on the order of several hundred bytes, and therefore such a backup strategy would consume unacceptable amount of the available system bandwidth and increase the write amplification (WA) effect in the non-volatile memory.

Embodiments that are described herein provide improved methods and systems for managing translation information backup and recovery. In the disclosed techniques, the controller saves in the non-volatile memory a baseline version of the translation table and possibly one or more incremental updates that specify changes caused to the table relative to the baseline version due to subsequent storage operations.

In the disclosed embodiments, the controller saves the translation table to the non-volatile memory in blocks that are referred to herein as "baseline bulks," or simply "bulks" for brevity. A typical bulk size can be on the order of 1 Mbyte, but any other suitable bulk size can also be used.

Between the storage of successive bulks, the controller may apply storage operations that change the translation table relative to the baseline version. Such operations include writing user data and applying maintenance operations to the non-volatile memory such as garbage collection.

In some embodiments, the controller saves to the non-volatile memory incremental updates corresponding to the changes caused to the translation table between the storage of adjacent bulks. The size of an incremental update is typically much smaller than the bulk size, and therefore a backup scheme that controls the number of incremental updates is advantageous, as will be described below.

In some embodiments, the controller reconstructs, the translation table during boot by first loading the baseline bulks from the non-volatile memory back to the local volatile memory. The controller then "replays" the incremental updates and applies them on top of the baseline version. The boot time will typically be longer when the numbers of baseline bulks and incremental updates are larger, and vice versa.

Saving baseline bulks more frequently results in fewer incremental updates, i.e., shorter reconstruction time, but undesirably also in increased WA and reduced bandwidth for storage and maintenance operations. In some embodiments, during normal operation, the controller controls the expected reconstruction time of the translation table during boot by adaptively adjusting the number of incremental updates allowed before saving a subsequent baseline bulk. In some embodiments, the maximum boot time is pre-specified, and the controller maximizes the number of incremental updates under a constraint of the boot reconstruction time.

Another important factor in the storage system is the overall size of the translation table, which depends on the write activity profile (random vs. sequential accessing profile) of the host. If the activity is largely random, the translation table tends to be fragmented and therefore larger. If the activity is largely sequential, the table will be compact and smaller.

In some embodiments, to comply with the maximum boot time specification, the controller adapts (during normal operation) the number of incremental updates that are allowed between successive storage of the baseline bulks, depending on the current size of the translation table, which as explained above, depends the host write activity profile. Thus, when the host activity has been largely random, resulting in a large table, the load time of baseline bulk increases, and therefore the time remaining for loading and replaying incremental updates gets shorter. As a result, the controller allows a smaller number of incremental updates to be saved between bulk pieces. In this case the controller stores the baseline bulks more often and allows fewer incremental updates in between. When the host activity is largely sequential, resulting in a smaller table, a larger number of incremental updates can be loaded and replayed within the specified boot time. In this case the controller stores the baseline bulks less frequently and allows more incremental updates.

In the disclosed techniques, the ratio between the baseline bulks and the incremental updates, as well as the bulk size, are adjusted adaptively so as to meet a boot time constraints in recovering the translation table, while reducing WA and improving the storage throughput.

System Description

Figure 1:
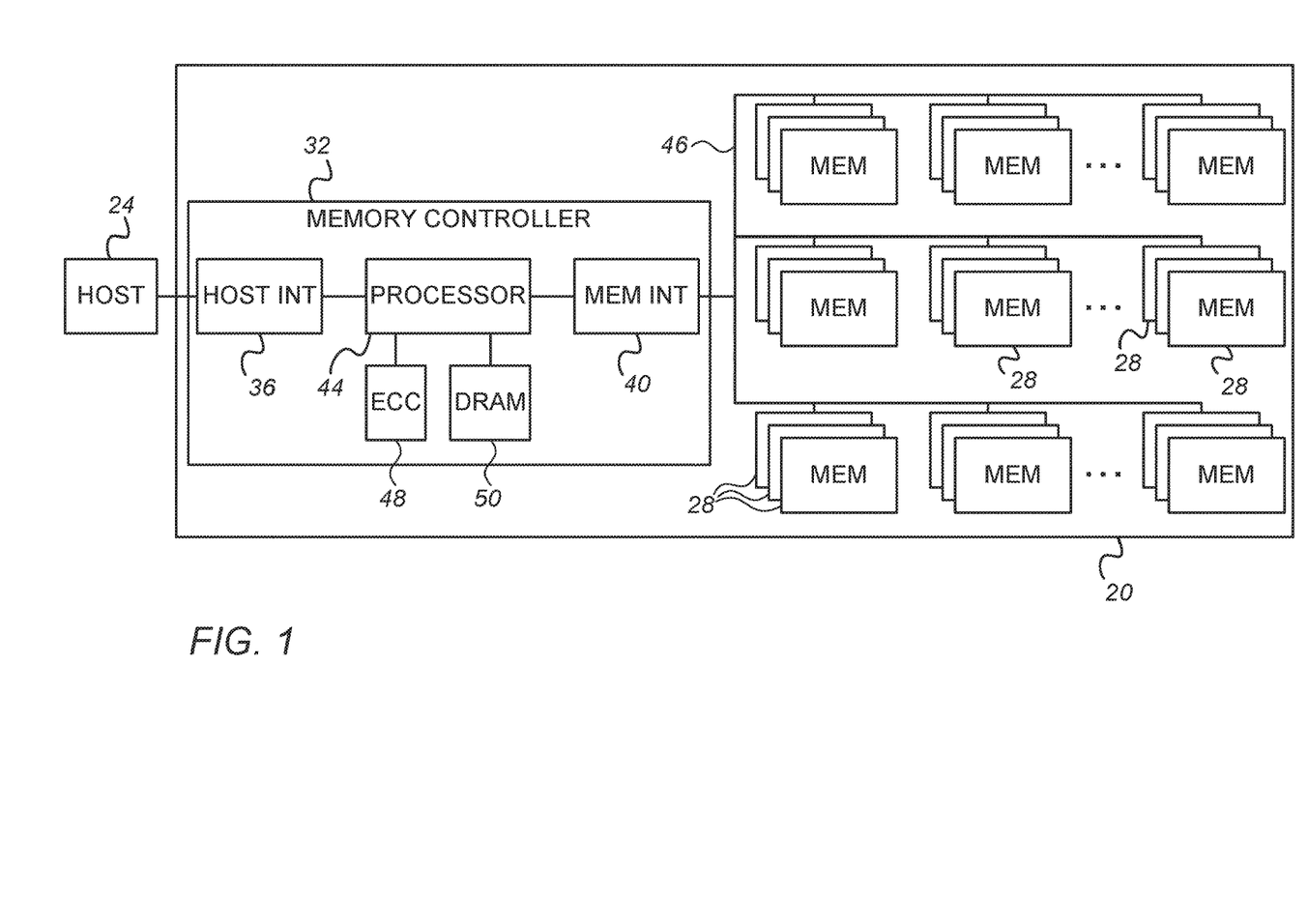
FIG. 1 is a block diagram that schematically illustrates a memory system, in accordance with an embodiment that is described herein.

FIG. 1 is a block diagram that schematically illustrates a multi-device memory system 20, in accordance with an embodiment that is described herein. System 20 accepts data for storage from a host 24 and stores it in memory, and retrieves data from memory and provides it to the host. In the present example, system 20 comprises a Solid-State Disk (SSD) that stores data for a host computer. In alternative embodiments, however, system 20 may be used in any other suitable application and with any other suitable host, such as in computing devices, cellular phones or other communication terminals, removable memory modules, Secure Digital (SD) cards, Multi-Media Cards (MMC) and embedded MMC (eMMC), digital cameras, music and other media players and/or any other system or device in which data is stored and retrieved.

System 20 comprises multiple memory devices 28, each comprising multiple memory cells. In the present example, devices 28 comprise non-volatile NAND Flash devices, although any other suitable type of non-volatile memory that retains its stored information even when not powered, can also be used. Non-volatile memories include, for example, ferroelectric, resistive, and magneto-resistive RAMs.

In some embodiments, the memory cells of devices 28 comprise analog memory cell that hold a continuous, analog value of a physical parameter, such as an electrical voltage or charge. Any suitable type of analog memory cells, such as the types listed above, can be used. In the present example, each memory device 28 comprises a non-volatile memory of NAND Flash cells. The charge levels stored in the cells and/or the analog voltages or currents written into and read out of the cells are referred to herein collectively as analog values or storage values.

System 20 stores data in the memory cells by programming the cells to assume respective memory states, which are also referred to as programming levels. The programming levels are selected from a finite set of possible levels, and each level corresponds to a certain nominal storage value. For example, a 2 bit/cell MLC can be programmed to assume one of four possible programming levels by writing one of four possible nominal storage values into the cell.

The memory cells are typically arranged in rows and columns. Typically, a given memory device comprises multiple erasure blocks (also referred to as memory blocks), i.e., groups of memory cells that are erased together. Data typically cannot be reprogrammed in-place, and memory blocks are therefore erased before being programmed with other data. Data is typically programmed to groups of memory cells, and retrieved from the groups of the memory cells in data units that are referred to as data pages, or simply pages, for brevity.

Each memory device 28 may comprise a packaged device or an unpackaged semiconductor chip or die. A typical SSD may comprise a number of memory devices each having storage capacity of, e.g., 32 GB or 128 GB. Generally, however, system 20 may comprise any suitable number of memory devices of any desired type and size. Although the system configuration of FIG. 1 comprises multiple memory devices, some of the methods and systems described herein can also be used in systems having only a single memory device.

System 20 comprises a memory controller 32, which accepts data from host 24 and stores it in memory devices 28, and retrieves data from the memory devices and provides it to the host. Memory controller 32 comprises a host interface 36 for communicating with host 24, a memory interface 40 for communicating with memory devices 28, and a processor 44 that processes the stored and retrieved data. In some embodiments, controller 32 encodes the stored data with an Error Correction Code (ECC). In these embodiments, controller 32 comprises an ECC unit 48, which encodes the data before being stored in devices 28 and decodes the FCC of data retrieved from devices 28. The functions of processor 44 can be implemented, for example, using software running on a suitable Central Processing Unit (CPU), using hardware (e.g., state machine or other logic), or using a combination of software and hardware elements.

Controller 32 communicates with memory devices 28 over a bus 46. Bus 46 may comprise any suitable link or bus such as a parallel bus or a serial bus, or a packet-based bus such as PCIe. Bus 46 may operate in accordance with any suitable standard or protocol, and at any suitable rate.

To apply a storage command to a given memory device, the controller sends the storage command to the memory device over bus 46. Types of storage commands include, for example, page write, page read and block erasure commands. In some embodiments, system 20 supports storage commands that are applied to multiple memory devices in parallel.

In some embodiments, host 24 runs a File System (FS—not shown in the figure), which stores one or more files in system 20. The FS stores the files in the SSD using a logical addressing scheme. In such a scheme, the FS assigns each file a group of one or more logical addresses (also referred to as Logical Block Addresses—LBAs), and sends the file data to system 20 for storage in accordance with the LBAs.

Processor 44 of memory controller 32 typically maintains a logical-to-physical address translation, which associates the logical addresses specified by the host with respective physical storage locations (also referred to as physical addresses) in Flash devices 28, and stores the data in the appropriate physical storage locations. The logical-to-physical address translation (also referred to as Virtual-to-Physical mapping—V2P) may be stored in a local volatile memory of the memory controller such as DRAM 50, in Flash devices 28, or in both.

In some of the disclosed embodiments, memory controller 32 holds the logical-to-physical translation in a translation table in DRAM 50. The size of the translation table is typically on the order of several hundred Mbytes. Memory controller 32 saves the translation table in memory devices 28 so that during system boot, e.g., after power shutdown, the translation table can be recovered.

Memory controller 32, and in particular processor 44, may be implemented in hardware. Alternatively, the memory controller may comprise a microprocessor that runs suitable software, a combination of hardware and software elements. In some embodiments, processor 44 comprises a general-purpose processor, which is programmed in software to carry out the functions described herein. The software may be downloaded to the processor in electronic form, over a network, for example, or it may, alternatively or additionally, be provided and/or stored on tangible media, such as magnetic, optical, or electronic memory.

The system configuration of FIG. 1 is an example configuration, which is shown purely for the sake of conceptual clarity. Any other suitable memory system configuration can also be used. Elements that are not necessary for understanding the principles of the present invention, such as various interfaces, addressing circuits, timing and sequencing circuits and debugging circuits, have been omitted from the figure for clarity.

In the exemplary system configuration shown in FIG. 1, memory devices 28 and memory controller 32 are implemented as separate Integrated Circuits (ICs). In alternative embodiments, however, the memory devices and the memory controller may be integrated on separate semiconductor dies in a single Multi-Chip Package (MCP) or System on Chip (SoC), and may be interconnected by an internal bus. Further alternatively, some or all of the memory controller circuitry may reside on the same die on which one or more of the memory devices are disposed. Further alternatively, some or all of the functionality of memory controller 32 can be implemented in software and carried out by a processor or other element of the host system, or by any other type of memory controller. In some embodiments, host 24 and Memory controller 32 may be fabricated on the same die, or on separate dies in the same device package.

Translation Table Backup and Reconstruction

Consider a logical-to-physical translation table managed by memory controller 32 in DRAM 50. In a typical implementation, an entry in the translation table maps a range of logical addresses to a respective range of physical addresses. In supporting reconstruction of the translation table, e.g., during booting up after power shutdown, the memory controller saves updated translation information in non-volatile memory devices 28.

The controller can carry out a graceful or ungraceful backup. In a graceful backup the controller saves the same version of translation table that is stored in the DRAM to the non-volatile memory. In this case the controller reconstructs the translation table by loading the saved table from the non-volatile memory.

In an ungraceful backup, the controller saves a baseline version of the translation table in the non-volatile memory, along with one or more incremental updates, which specify changes caused to the translation table relative to the baseline version due to subsequent storage operations. To reconstruct the translation table, the controller loads the baseline version from the non-volatile memory to the DRAM, further loads the saved incremental updates, and applies the incremental updates on top of the baseline version.

In the disclosed embodiments, the controller saves a baseline version of the translation table by partitioning the table into multiple blocks that are referred to herein as "bulks." The controller sends the bulks comprising the baseline version for storage in the non-volatile memory at a selected rate. Subsequent storage operations may cause changes to the translation table in the DRAM relative to the baseline version. Such storage operations include user operations such as writing or deleting user data. Storage operations that also affect the content of the translation table include maintenance operations to memory devices 28 such as garbage collection.

The controller can save a given translation table, in various combinations of bulks and incremental updates. For example, saving the bulks at a higher rate reduces the number of incremental updates and vice versa. Frequent bulk writing, however, increases the write amplification (WA) effect in memory devices 28, and reduces the SSD throughput because saving the bulks consumes bandwidth that would have otherwise remained available for user and maintenance storage operations.

Figure 2:
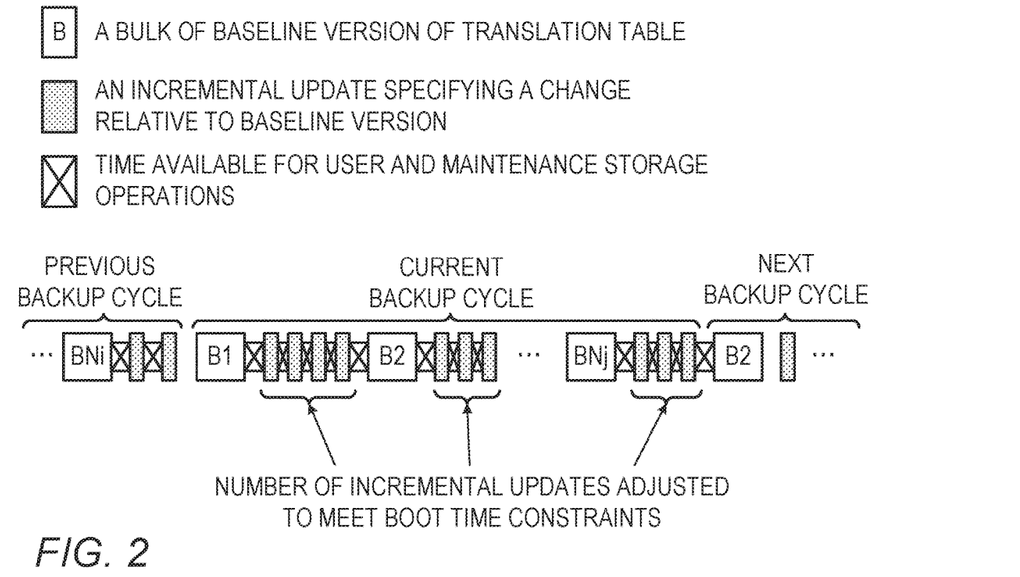
FIG. 2 is a diagram that schematically illustrates periodic backup of physical-to-logical translation information, in accordance with an embodiment that is described herein.

FIG. 2 is a diagram that schematically illustrates periodic backup of physical-to-logical translation information, in accordance with an embodiment that is described herein. In FIG. 2, a white box represents a baseline bulk and a colored box represents an incremental update. White boxes marked with "X" represent periods available for user storage operations and maintenance operations.

In FIG. 2, a backup cycle of the translation table comprises storing a baseline version of the table and possibly related incremental updates that together with the baseline version can be used for recovering the translation table. The baseline version is stored in multiple bulks denoted Bi. Between successive bulks, the controller possibly applies user storage operations and maintenance operations, and saves incremental updates caused to the translation table by these operations. As described above, given a baseline version, the rate in which the baseline bulks are saved determines the number of incremental updates required for recovery.

Consider saving translation information including Nb baseline bulks and Nu incremental updates. Let Tb denote the load time of a single bulk from the non-volatile memory to the DRAM, and Tu denote the load and replay time of an incremental update. The overall reconstruction time Trec is given by:

$$Trec = Tb \cdot Nb + Tu \cdot Nu \qquad \text{Equation 1:}$$

In a typical implementation, Tb and Tu are on the order of a few milliseconds and a few microseconds, respectively, e.g., Tb=5 milliseconds and Tu=3 microseconds. In an example SSD having a storage capacity of 512 Gbytes and a DRAM of 512 Mbytes, the baseline version of the translation table may require 400 Mbytes in the DRAM, i.e., 400 bulks of 1 Mbytes. If in the present example the time for ungraceful reconstruction is limited to 10 seconds, the total number of incremental updates Nu is limited to about 2.6 million.

As seen in Equation 1, given a number of baseline bulks Nb, the overall number of incremental updates Nu determines the overall recovery time. Thus, decreasing the rate in which the baseline bulks are stored increases the number of incremental updates Nu, which improves WA in the memory devices and increases the throughput during normal SSD operation. A large Nu, however, may cause Trec to be longer than a predefined maximum allowed value denoted Ttarget. It is therefore desirable to maximize Nu without exceeding Ttarget. The maximal allowed number of incremental updates Nmax satisfies:

$$Tb \cdot Nb + Tu \cdot Nmax \leq Ttarget \qquad \text{Equation 2:}$$

Figure 3:
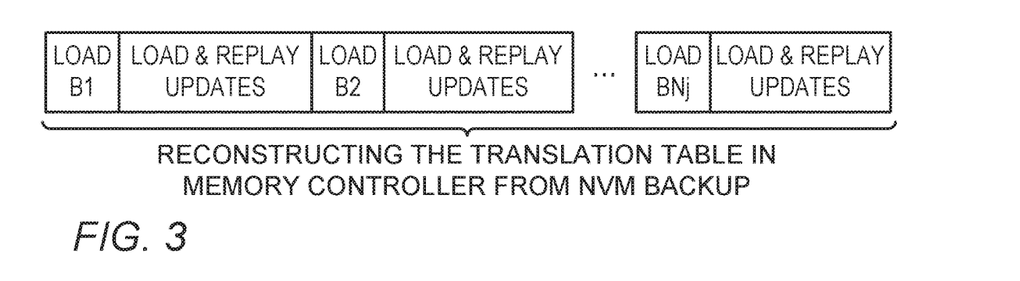
FIG. 3 is a diagram that schematically illustrates reconstructing a translation table from previously backed-up translation information, in accordance with an embodiment that is described herein.

FIG. 3 is a diagram that schematically illustrates reconstructing a translation table from previously backed-up translation information. In accordance with an embodiment that is described herein. In the example of FIG. 3, the controller loads a bulk and the incremental updates related to this bulk. The controller then replays the incremental updates on top of the baseline bulk to reconstruct the updated version of the bulk.

In alternative embodiments, other suitable reconstruction methods can also be used. For example, in one embodiment, the controller first loads all of the baseline bulks and then loads and replays the incremental updates. In another embodiment, the controller loads incremental updates belonging to any of already loaded baseline bulks, and replays these incremental updates accordingly. In yet other embodiments, any other suitable order of load and replay can also be used.

Adaptively Controlling the Number of Incremental Updates

Figure 4:
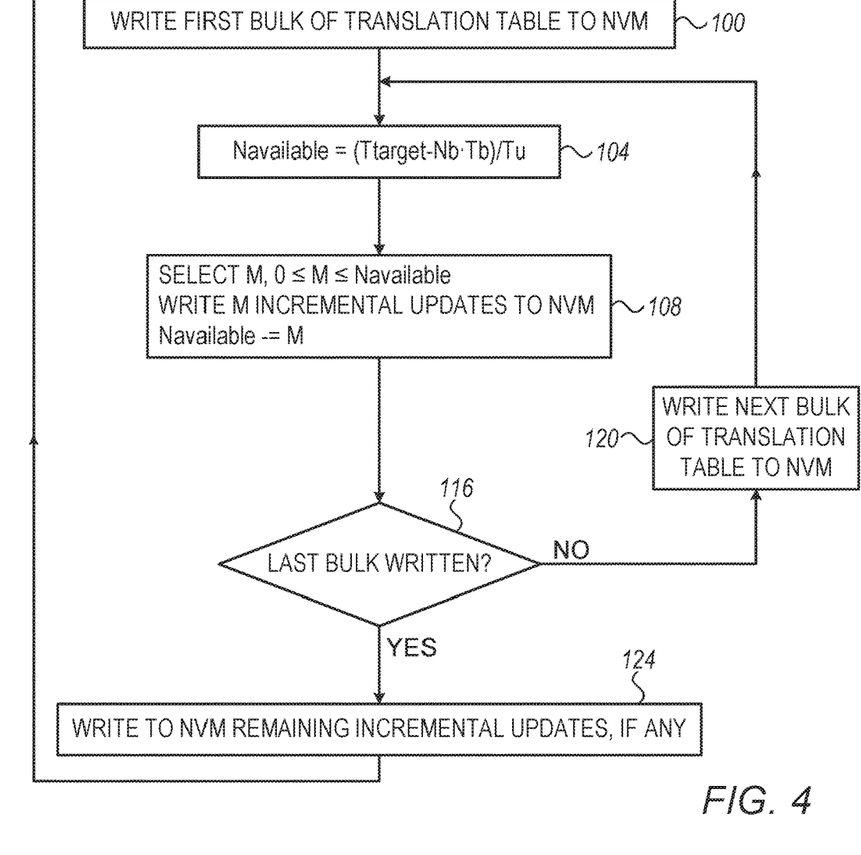
FIG. 4 is a flow chart that schematically illustrates a method for adaptively controlling the number of incremental updates, in accordance with an embodiment that is described herein.

FIG. 4 is a flow chart that schematically illustrates a method for adaptively controlling the number of incremental updates, in accordance with an embodiment that is described herein. The method may be executed, for example, by controller 32 (e.g., using processor 44) during normal operation.

The method begins with controller 32 writing the first bulk of the translation table locally stored in DRAM 50 to the non-volatile memory, at a backup cycle starting step 100. At a prediction step 104, the controller evaluates the number of available incremental updates by calculating:

$$Navailable = (Ttarget - Nb \cdot Tb)/Tu \qquad \text{Equation 3:}$$

In Equation 3, Ttarget denotes the total time available for the ungraceful recovery, Nb·Tb is the loading time of the Nb baseline bulks, (Ttarget−Nb·Tb) is the time remaining for loading and replaying incremental updates, and Tu is the (expected or average) load and replay time of a single incremental update. Note that the number of baseline bulks Nb, which depends on the size of the translation table, may change during the backup cycle.

At an updates backup step 108, the controller selects a number M of incremental updates, wherein M is in the range 0 to Navailable. The controller may select M using any suitable method. In an example embodiment, the controller selects M based on the storage workload so that a higher workload level implies selecting a smaller number N, and vice versa. In some embodiments, the controller selects M based on the bulk size while not violating the maximum boot time specified, and also sustaining host workload performance. For example, for a given bulk size, e.g., 1 Mbytes, the range of logical addresses (LBAs) covered by the translation information contained in the bulk measures the fragmentation level for this bulk. The higher the fragmentation, the lower the covered LBA range. In an embodiment, the controller selects M based on the ratio between the LBA range covered by a bulk and the bulk size, which ratio serves as a measure of the fragmentation level.

When the number M selected at step 108 is nonzero, the controller executes user and/or maintenance storage operations and updates the translation table in DRAM 50 accordingly. For each operation that changes the translation table relative to the baseline version the controller writes a respective incremental update to the non-volatile memory. The controller continues this process until sending M incremental updates to the non-volatile memory. Further at step 108, the controller updates the number of available incremental updates Navailable by subtracting the value of M.

At a loop management step 116, the controller checks whether the last baseline bulk has been written to the non-volatile memory, and if so, proceeds to a cycle termination step 124, in which the controller writes to the non-volatile memory a number Navailable of the remaining incremental updates, if Navailable>0.

If at step 116 one or more baseline bulks are yet to be saved, the controller selects a subsequent baseline bulk from the baseline table and writes the selected bulk to the non-volatile memory, at a bulk writing step 120. The controller then loops back to step 104 to update the number of available incremental updates.

In the method of FIG. 4 the controller has knowledge of the overall size of the logical-to-physical mapping table, or equivalently, the number of baseline bulks Nb. In another embodiment, instead of, or in addition to using the table size, the controller adjusts the number of incremental updates between successive bulks based on the write activity profile (random vs. sequential address accessing) of the host.

When the host activity is largely random, the translation table tends to be fragmented and therefore larger. When the host activity is largely sequential, the translation table tends to be compact and smaller. Therefore, in some embodiments, to comply with the maximum boot time specification, the controller adapts (during normal operation) the number of incremental updates that are allowed between successive storage of the baseline bulks, depending on the host write activity profile.

When the activity is largely random, the table is large, and only a small number of incremental updates can be loaded and replayed within the specified boot time. In this case the controller stores the baseline bulks more often and allows fewer incremental updates.

When the activity is largely sequential, the table is smaller, and a larger number of incremental updates can be loaded and replayed within the specified boot time. In this case the controller stores the baseline bulks less frequently, and allows more incremental updates.

Additional Variations and Embodiments

Figure 5:
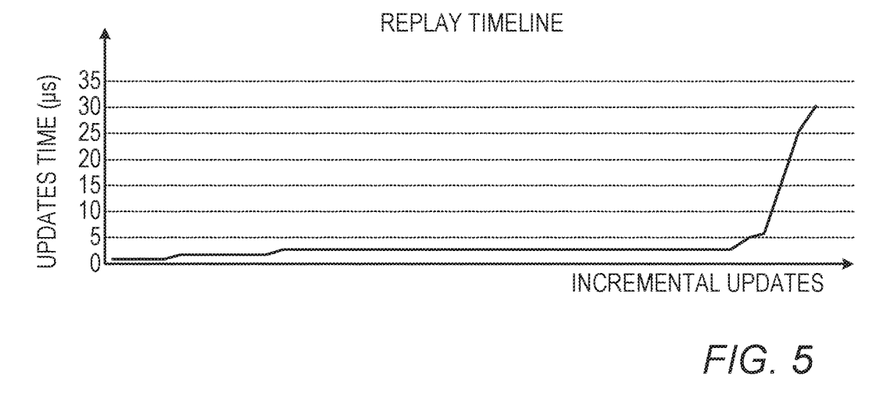
FIG. 5 is a graph depicting the replay time of the incremental updates during boot time, in accordance with an embodiment that is described herein.

FIG. 5 is a graph depicting the replay time of the incremental updates during boor time, in accordance with an embodiment that is described herein. As seen in the figure, the replay time of the incremental updates increases as the reconstruction of the translation table in the DRAM progresses. This may happen, for example, when the translation table is highly fragmented, and in order to reduce the table size in the DRAM, the controller performs one or more de-fragmentation operations as the reconstruction progresses.

In a variant embodiment, the controller predicts whether reconstructing the translation table during boot requires de-fragmentation, and if so, decreases the number of incremental updates saved between bulks during normal operation. The controller predicts the need for de-fragmentation during boot, during normal operation, or both. In an extreme situation, in which intensive de-fragmentation is required, the controller saves during normal operation only baseline bulks and no incremental updates.

In another variant embodiment, the controller may decide to re-use a recent baseline version of the translation table and to save during normal operation only incremental updates. In an example embodiment, if during a recent boot operation the replay time of the incremental updates was shorter than a predefined time limit, e.g., 100 milliseconds, the controller maintains the baseline version, does not save any baseline bulks, and only saves incremental updates in the non-volatile memory. By avoiding saving updated baseline bulks to the non-volatile memory devices, the WA effect in the non-volatile memory devices improves significantly.

The embodiments disclosed above are given by way of example, and other suitable embodiments can also be used. For example, although in the embodiments described above we mainly assume a fixed bulk size, in alternative embodiments, the baseline version of the translation table may be divided into multiple bulks of a non fixed size.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:
1. An apparatus, comprising:
at least one non-volatile memory;
at least one processor; and at least one memory storing instructions that, when executed by the at least one processor, cause the apparatus to:

manage a translation table that maps logical addresses to respective physical addresses of the at least one non-volatile memory;

divide the translation table into a plurality of baseline portions;

periodically and successively store the plurality of baseline portions to the at least one non-volatile memory;

determine a maximal number of incremental updates that, when recovered together with the translation table from the at least one non-volatile memory and replayed by the apparatus, satisfies a target recovery time of the translation table; and periodically store the maximal number of incremental updates to the at least one non-volatile memory, wherein each incremental update specifies changes to a respective baseline portion of the translation table caused by storage operations that take place between periodically and successively storing the plurality of baseline portions.

2. The apparatus of claim 1, wherein an incremental update is associated with an estimated replay time, and the maximal number of incremental updates is based on the estimated replay time.

3. The apparatus of claim 1, wherein the at least one processor further causes the apparatus to:

determine the maximal number of incremental updates by evaluating a remaining time of the target recovery time for loading and replaying the incremental updates, with an assumption that the translation table is loaded.

4. The apparatus of claim 1, wherein the at least one processor further causes the apparatus to:

select a differential number of the incremental updates allowed between periodically and successively storing the baseline portions based on a baseline portion size so as to meet the target recovery time and to sustain a workload performance of the apparatus.

5. The apparatus of claim 4, wherein the at least one processor further causes the apparatus to:

select the differential number based on a fragmentation level of the translation table.

6. The apparatus of claim 1, wherein periodically and successively storing the plurality of baseline portions to the at least one non-volatile memory comprises:

in response to successively storing at least two baseline portions of the translation table into the at least one non-volatile memory:

updating information stored in the at least one non-volatile memory that indicates a last-stored baseline portion of the translation table.

7. The apparatus of claim 1, wherein the at least one processor further causes the apparatus to:

identify a write activity profile associated with the apparatus, wherein the write activity profile comprises a mixture of random activity and sequential activity, and the maximal number of incremental updates is based on the write activity profile.

8. A method implemented by a computing device, the method comprising:

managing a translation table that maps logical addresses to respective physical addresses of at least one non-volatile memory that communicably coupled to the computing device;

dividing the translation table into a plurality of baseline portions;

periodically and successively storing the plurality of baseline portions to the at least one non-volatile memory;

determining a maximal number of incremental updates that, when recovered together with the translation table from the at least one non-volatile memory and replayed by the computing device, satisfies a target recovery time of the translation table; and periodically storing the maximal number of incremental updates to the at least one non-volatile memory, wherein each incremental update specifies changes to a respective baseline portion of the translation table caused by storage operations that take place between periodically and successively storing the plurality of baseline portions.

9. The method of claim 8, wherein an incremental update is associated with an estimated replay time, and the maximal number of incremental updates is based on the estimated replay time.

10. The method of claim 8, further comprising:

determining the maximal number of incremental updates by evaluating a remaining time of the target recovery time for loading and replaying the incremental updates, with an assumption that the translation table is loaded.

11. The method of claim 8, further comprising: select a differential number of the incremental updates avowed between periodically and successively storing the baseline portions based on a baseline portion size so as to meet the target recovery time and to sustain a workload performance of the computing device.

12. The method of claim 11, further comprising:

selecting the differential number based on a fragmentation level of the translation table.

13. The method of claim 8, wherein periodically and successively storing the plurality of baseline portions to the at least one non-volatile memory comprises:

in response to successively storing at least two baseline portions of the translation table into the at least one non-volatile memory;

updating information stored in the at least one non-volatile memory that indicates a last-stored baseline portion of the translation table.

14. The method of claim 8, further comprising:

identifying a write activity profile associated with the computing device, wherein the write activity profile comprises a mixture of random activity and sequential activity, and the maximal number of incremental updates is based on the write activity profile.

15. At least one non-transitory computer readable storage medium configured to store instructions that, when executed by at least one processor included in a computing device, cause the computing device to carry out steps that include:

managing a translation table that maps logical addresses to respective physical addresses of at least one non-volatile memory that is communicably coupled to the computing device;

dividing the translation table into a plurality of baseline portions;

periodically and successively storing the plurality of baseline portions to the at least one non-volatile memory;

determining a maximal number of incremental updates that, when recovered together with the translation table from the at least one non-volatile memory and replayed by the computing device, satisfies a target recovery time of the translation table; and periodically storing the maximal number of incremental updates to the at least one non-volatile memory, wherein each incremental update specifies changes to a respective baseline portion of the translation table caused by storage operations that take place between periodically and successively storing the plurality of baseline portions.

16. The at least one non-transitory computer readable storage medium of claim 15, wherein an incremental update is associated with an estimated replay time, and the maximal number of incremental updates is based on the estimated replay time.

17. The at least one non-transitory computer readable storage medium of claim 15, wherein the steps further include:
   determining the maximal number of incremental updates by evaluating a remaining time of the target recovery time for loading and replaying the incremental updates, with an assumption that the translation table is loaded.

18. The at least one non-transitory computer readable storage medium of claim 15, wherein the steps further include:
   select a differential number of the incremental updates allowed between periodically and successively storing the baseline portions based on a baseline portion size so as to meet the target recovery time and to sustain a workload performance of the computing device.

19. The at least one non-transitory computer readable storage medium of claim 15, wherein periodically and successively storing the plurality of baseline portions to the at least one non-volatile memory comprises:
   in response to successively storing at least two baseline portions of the translation table into the at least one non-volatile memory:
      updating information stored in the at least one non-volatile memory that indicates a last-stored baseline portion of the translation table.

20. The at least one non-transitory computer readable storage medium of claim 15, wherein the steps further include:
   identifying a write activity profile associated with the computing device, wherein the write activity profile comprises a mixture of random activity and sequential activity, and the maximal number of incremental updates is based on the write activity profile.

* * * * *

UNITED STATES PATENT AND TRADEMARK OFFICE
CERTIFICATE OF CORRECTION

PATENT NO. : 10,162,561 B2
APPLICATION NO. : 15/190216
DATED : March 8, 2016
INVENTOR(S) : Paley et al.

Page 1 of 1

It is certified that error appears in the above-identified patent and that said Letters Patent is hereby corrected as shown below:

In the Claims

In Claim 8, at Column 11, Line 64: "memory that communicably coupled" should read -- memory that is communicably coupled --.

In Claim 11, at Column 12, Line 27: "incremental updates avowed" should read -- incremental updates allowed --.

In Claim 13, at Column 12, Line 40: "non-volatile memory;" should read -- non-volatile memory: --.

Signed and Sealed this
Twenty-sixth Day of November, 2019

Andrei Iancu
*Director of the United States Patent and Trademark Office*